United States Patent

Thode

[15] 3,683,198

[45] Aug. 8, 1972

[54] LOAD MONITORED STANDBY POWER SYSTEM

[72] Inventor: Herbert William Thode, Allendale, N.J.

[73] Assignee: Regulators Incorporated, Allendale, N.J.

[22] Filed: Feb. 3, 1971

[21] Appl. No.: 112,449

Related U.S. Application Data

[63] Continuation of Ser. No. 834,738, June 19, 1969, abandoned.

[52] U.S. Cl. ................................................. 307/66
[51] Int. Cl. ............................................. H02j 7/00
[58] Field of Search .......... 207/64, 65, 66, 85, 86, 87, 207/56, 57, 58, 43, 112; 317/137, 157

[56] References Cited

UNITED STATES PATENTS 3,389,268   6/1968   Jamieson et al. ............ 307/66

Primary Examiner—Herman J. Hohauser
Attorney—Norman N. Holland

[57] ABSTRACT

A system for turning a standby power supply on and off in which the standby power is only activated upon a demand from the load being supplied. The system is particularly useful, for example, in alternating current systems where the standby power includes an inverter for converting a direct current battery source to an alternating voltage. Inverters of this type have a relatively large internal loss which would cause a large battery drain whether or not the standby power is supplying a load. The improved system of the invention includes a load monitoring means which turns the inverter on only when a load is presented to the standby power thereby substantially eliminating the no-load inverter losses.

12 Claims, 3 Drawing Figures

INVENTOR.
HERBERT W. THODE
BY
ATTORNEY

LOAD MONITORED STANDBY POWER SYSTEM

This application is a continuation of application Ser. No. 834,738 filed June 19, 1969 and now abandoned.

BACKGROUND OF THE INVENTION

The present invention relates to improvements in standby power systems and more particularly to a means for reducing no-load losses in battery powered standby systems.

There are a relatively large number of electrical systems where it is essential or desirable to have automatic standby power to take over system operation when there is a failure in main power supply. The presently used and known systems include some type of voltage or current sensing switch which is activated by a loss of the input power and which automatically activates a standby power supply, such as a battery powered supply, to take over.

In a significant number of such systems, there is a relatively large power loss inherent in the standby system which is present even though there happens to be no particular load on the standby system.

One example of a system having a high no-load loss is the commonly used alternating current standby system where battery power is converted to an auxiliary alternating current power using an inverter. Inverters for the conversion of direct current to alternate current normally have an appreciable internal loss whether they are supplying a load or not.

Thus, an automatic sensing system may turn on the inverter due to a power failure thereby resulting in an appreciable discharge of the standby batteries even though there may be no need at that particular time for standby power.

The system of the present invention provides a monitoring means which senses a failure of the main power supply and which additionally monitors the load to be supplied by the standby system so that the inverter or other standby power supply is activated only when needed.

Accordingly, an object of the present invention is to provide an improved standby power system.

Another object of the present invention is to provide an improved standby power system which includes a load monitor for activating the standby power only when it is required for supplying a load.

Another object of the present invention is to provide an improved monitor means for detecting the application of a load to a power supply system.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the application, wherein.

DESCRIPTION OF THE PREFERRED EMBODIMENT

Figure 1:
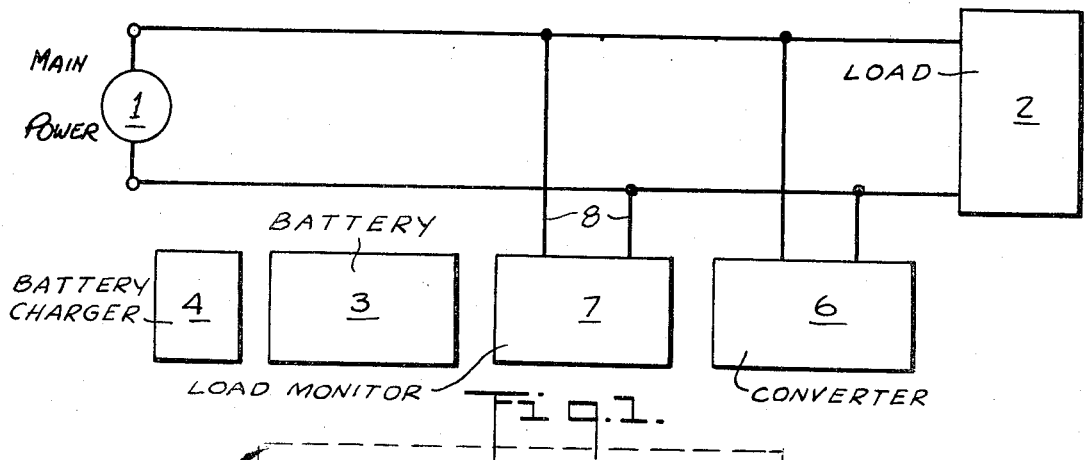
FIG. 1 is a block diagram illustrating the standby system in a power supply system.

FIG. 1 illustrates in block diagram form the principal elements of the system in position within a power distribution and utilization circuit. A regular alternating current power source 1 is shown which is coupled to a normal load 2 for regular operation and which is also coupled to a standby battery energy source 3 including a battery charger 4. An energy converter 6 is coupled between the load 2 and the battery 3 and the converter 6 is seen to be under the control of a load monitor means 7 which includes load sensing lines 8. During normal operation, the main power input 1 operates the load 2 directly and, at the same time, the standby battery source 3 is recharged as necessary under the control of a usual charge registering means to keep the batteries 3 at full charge. As discussed more fully below, the converter 6 may be an inverter for converting the direct current battery output to an alternating current supply similar in voltage and frequency to that of the input power source 1. The control or monitor means 7 activates the inverter after a power failure and only upon a demand signal from the load through sensing lines 8 indicating that there is power requirement for the load 2.

Figure 2:
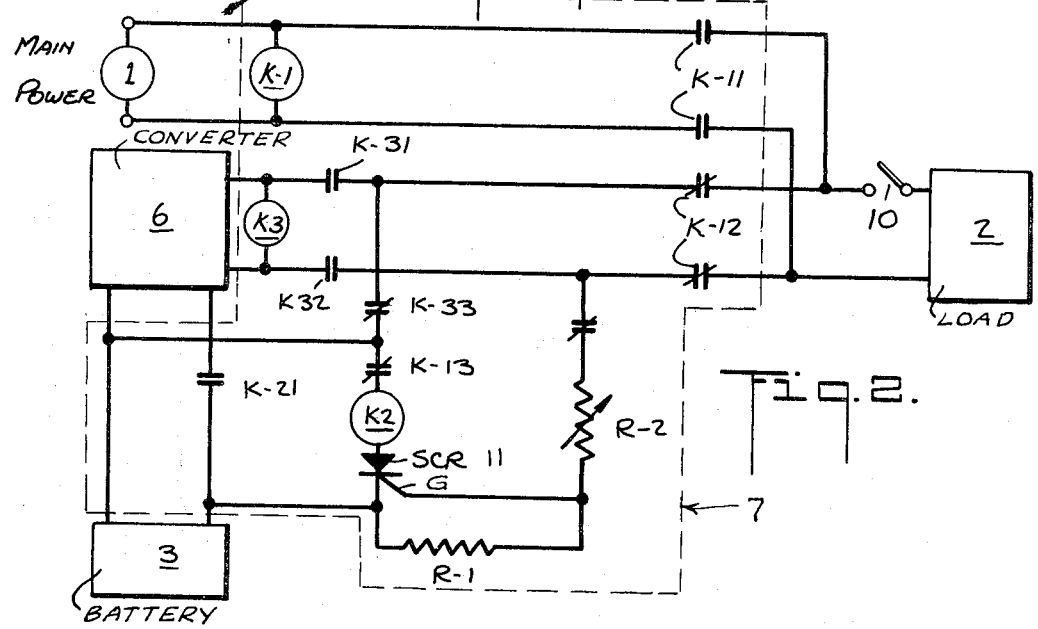
FIG. 2 is a diagram illustrating one embodiment of the load monitoring system in accordance with the present invention.

FIG. 2 illustrates a preferred embodiment of the load monitored standby system with control means 7. A conventional commercial power source 1, such as a 110 volt line, is shown connected to a load 2 through a pair of normally opened relay contacts K–11. These contacts are held closed during the normal operation as their related relay solenoid K–1 is coupled across the regular power input 1. A second set of contacts K–12 also controlled by the solenoid K–1 are normally held open when the solenoid K–1 is energized to isolate the standby power system from the load 2. When the power 1 fails, contacts K–11 open and contacts K–12 together with contact K–13 are closed as solenoid K–1 is de-energized. At the time that this happens, a load switch 10 may be open so that no standby power is required.

The remaining portions of the circuit for control means 7, not already described, are provided to activate the power inverter 6 only when the load switch 10 is closed. With contact K–13 closed, for the reasons indicated above, voltage from the standby power source or battery 3 is present across a series connection including closed relay contact K–13, a second relay coil K–2, and an SCR 11. In order to couple the inverter 6 to the battery 3, it is now necessary to place a voltage on the SCR gate G thereby energizing relay coil K–2 to close its related relay contact K-21.

The gate voltage for firing the SCR is obtained when the load switch 10 is closed as this is seen to place the battery 3 output voltage across a voltage divider including resistors R–1 and R–2 which determine a firing voltage for the gate G at their common terminals. The SCR 11 now conducts while energizing relay coil K–2 and thereby closing relay contact K–21 and applying battery voltage to the inverter 6 input. A converted or alternating current output is now supplied by the inverter 6 for the load 2. This voltage output energizes relay coil K-3 thereby closing a pair of contacts K-31 and K-32 to couple the voltage to the load 2 through closed relay contacts K-12. A third contact K-33 and a fourth contact K-34 are simultaneously opened by the energized coil K-3 to prepare the SCR 11 for shut-down when the main power supply 1 returns.

When the main power supply 1 does return, relay coil K-1 is again energized closing contacts K-11 and opening contacts K-12 and contact K-13 to deactivate relay coil K-2. This opens relay contact K-21 to remove the battery power source 3 from the inverter 6 thereby cutting off the auxiliary power supply.

AN ALTERNATE EMBODIMENT

Figure 3:
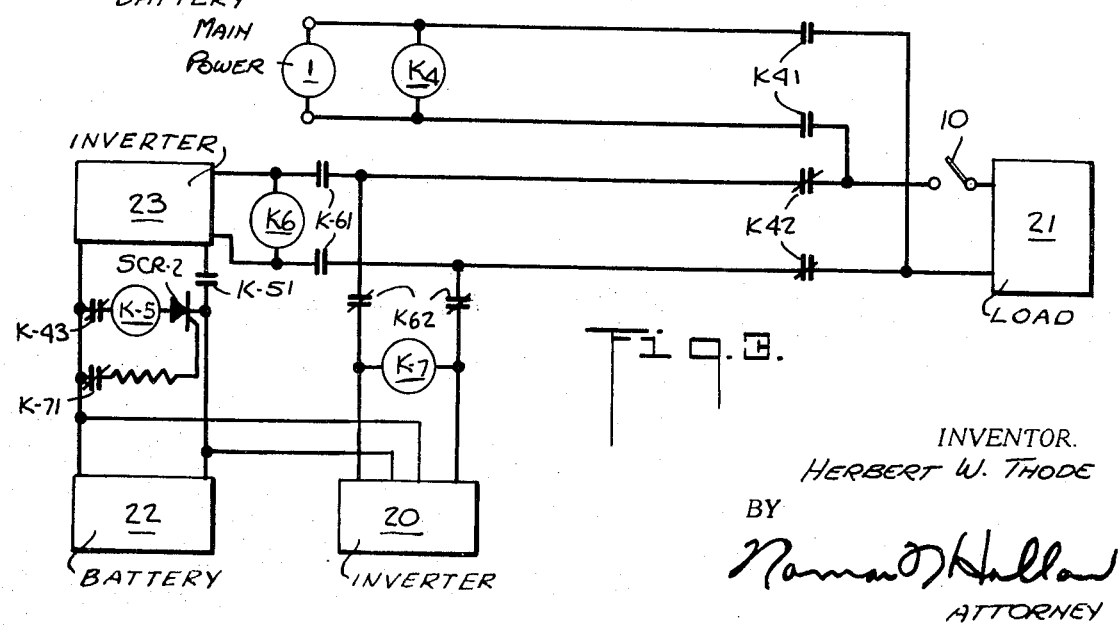
FIG. 3 is another embodiment of the system in accordance with the present invention showing a pilot inverter and a main inverter which are selectively activated in accordance with the power required in the standby system.

FIG. 3 illustrates another embodiment of the auxiliary power system which incorporates two separately activated inverters. A reduction in the standby battery current drain or a reduction in power losses is realized by utilizing a small auxiliary inverter for lesser loads such as may be present for the entire period of the power failure and a larger inverter for heavier periodic loads.

A standby inverter 23 is provided whose volt-ampere output is sufficient to carry the entire emergency load 21 and which will be turned on when the load 21 requires this power.

When the main power fails, a load detection system consisting of a small pilot inverter 20 will be immediately switched to the critical load 21 as relay coil K-4 is de-energized and contacts K-41 open and contacts K-42 and K-43 close. This inverter 20 will be sized, depending upon the application, to handle that fraction of the critical load 21 which must be energized during the entire standby period. The inverter 20 which is designed to carry a relatively small load will have negligible internal losses when it is connected to the battery 22 and while it is cut off so that it is supplying no load. This smaller inverter 20 therefore may be kept coupled to the battery if desired at all times and will impose no significant power drain on the battery 22. After a main power failure, the smaller inverter 20 will pick up the continuing or minimal standby power requirements which will be only a fraction of the entire system load so that the small inverter 20 will then supply this critical small load with a minor drain on the battery 22 and with still only negligible internal power losses being experienced within the small inverter 20.

When an emergency occurs, and the critical load 21 suddenly requires the full power available from the standby inverter 23, the output voltage of the pilot inverter 20 collapses due to a circuit breaker or similar device ordinarily associated with an inverter to prevent a burn-out for an overload current. The K-7 relay drops out closing contacts K-71 to trigger the Thyristor SCR-2 which causes the K-5 contactor coil to be energized. The contacts K-51 close and the battery 22 is then directly across the standby inverter 23. The standby inverter 23 now operates, and as its output voltage build up the K-6 relay coil is energized closing contacts K-61 and opening contacts K-62 connecting the standby inverter 23 to the critical load 21 and disconnecting the pilot inverter 20.

Upon the return of the main power source, K-4 is energized and the critical load is transferred to the main source of power as contacts K-41 close and contacts K-42 and K-43 open. Relay coil K-2 is de-energized and the standby pilot load sensitive system is ready for the new power outage.

It will be seen that an improved standby power system has been provided which significantly reduces the no-load power losses. This result is obtained by the use of a load sensing means which controls the standby power source so that the standby power remains inactive until the standby power is required to feed a particular load. The improved standby system therefore is altered or placed on a standby basis as soon as the main power supply fails or drops below the predetermined threshold. However, the standby power source thereafter remains inactive and is only activated when a load is detected by the load monitoring circuit. This type of standby power is particularly useful where the standby system has relatively large internal losses, such as is the case with larger inverters which convert direct current voltage to alternating current voltage. In this case, the system of the invention keeps the inverters inoperative until they are required to supply a load. The monitoring means discussed herein is itself relatively simple and requires virtually no power so that its addition to the standby power circuit does not add any significant additional power loss.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. In an electrical power supply system connecting a load to a main power source, a power standby control system for selective connection of said load to a standby power source comprising inverter means for selective connection to said standby power source load sensing means for detecting a power demand by said load upon failure of said main power source, and monitor means for electrically connecting said inverter means to said load upon failure of said main power source and in response to said load sensing means for connecting said standby power source to said inverter means only upon occurrence of said load power demand.

2. A power standby control system according to claim 1 wherein said main power source is A.C. electrical power and said standby power source is a D.C. electrical battery.

3. A power standby control system according to claim 2 wherein said monitor means comprises a pair of main power lines for running from said main power source to said load, a main power solenoid for connection across said main power source, first and second pairs of normally open contacts associated with said main power solenoid in said main power lines respectively; and a pair of inverter lines running from the output of said inverter means to said load, said inverter lines including third and fourth pairs of normally closed contacts associated with said main power solenoid in said inverter lines respectively.

4. A power standby control system according to claim 3 wherein said monitor means further comprises an inverter solenoid connected across the output of said inverter means and first and second pairs of normally open contacts in said inverter lines respectively associated with said inverter solenoid;
   a first pair of battery lines running from the output of said battery to the input of said inverter; and a second pair of battery lines running from said battery output to said load sensing means.

5. A power standby control system according to claim 4 wherein said load sensing means comprises a silicon controlled rectifier in series with a load-demand solenoid, a fifth pair of normally closed contacts associated with said main power solenoid and a pair of normally open contacts in one of said first battery output lines pair associated with said load-demand solenoid.

6. A power standby control system according to claim 5 wherein said load sensing means further comprises
   a pair of resistors in series connected at one end thereof to one of said inverter lines between said fourth pair of main power solenoid contacts and said second pair of inverter solenoid contacts and at the other end thereof to the junction of said silicon controlled rectifier and one of said second pair of battery output lines;
   the gate electrode of said silicon controlled rectifier being connected to the junction of said pair of resistors in series.

7. A power standby control system according to claim 6 wherein said monitor means further includes a third pair of normally closed contacts associated with said inverter solenoid connected between the other of said first battery output lines pair and the other of said inverter lines between said first pair of inverter solenoid contacts and said third pair of main power solenoid contacts.

8. A power standby control system according to claim 2 wherein said inverter means comprises a pilot inverter for connection to said battery in response to said load sensing means detecting a power demand by said load which does not exceed a predetermined level and a main inverter for connection to said battery in response to said load sensing means detecting a power demand by said load which exceeds said predetermined level.

9. A power standby control system according to claim 8 wherein said monitor means comprises
   a pair of main power lines for running from said main power source to said load, a main power solenoid for connection across said main power source, first and second pairs of normally open contacts associated with said main power solenoid in said main power lines respectively; and
   a pair of main inverter lines running from the output of said main inverter to said load, said main inverter lines including third and fourth pairs of normally closed contacts associated with said main power solenoid in said main inverter lines respectively.

10. A power standby control system according to claim 9 wherein said monitor means further comprises a main inverter solenoid connected across the output of said main inverter and first and second pairs of normally open contacts in said main inverter lines respectively associated with said main inverter solenoid; and
    a first pair of battery lines running from the output of said battery to the input of said main inverter.

11. A power standby control system according to claim 10 wherein said monitor means further comprises a second pair of battery lines running from said battery to the input of said pilot inverter; and
    a pair of pilot inverter lines running from the output of said pilot inverter to said main inverter lines respectively connected thereto between said third pair of main power solenoid contacts and said first pair of main inverter contacts, and between said fourth pair of main power solenoid contacts and said second pair of main inverter contacts.

12. A power standby control system according to claim 11 wherein said load sensing means is connected across said battery.

* * * * *